United States Patent
Smith et al.

(10) Patent No.: US 11,420,751 B2
(45) Date of Patent: Aug. 23, 2022

(54) MULTI-LATCH ASSEMBLY FOR SELECTIVE RETENTION OF AIRCRAFT PASSENGER TRAY TABLE AND/OR OTHER DEPLOYABLE COMPONENTS

(71) Applicant: Safran Seats USA LLC, Gainesville, TX (US)

(72) Inventors: Jason K. Smith, Denton, TX (US); Robert Funk, Grapevine, TX (US)

(73) Assignee: Safran Seats USA LLC, Gainesville, TX (US)

(*) Notice: Subject to any disclaimer, the term of this patent is extended or adjusted under 35 U.S.C. 154(b) by 0 days.

(21) Appl. No.: 17/279,887

(22) PCT Filed: Sep. 26, 2018

(86) PCT No.: PCT/US2018/052865
§ 371 (c)(1),
(2) Date: Mar. 25, 2021

(87) PCT Pub. No.: WO2020/068064
PCT Pub. Date: Apr. 2, 2020

(65) Prior Publication Data
US 2021/0394906 A1    Dec. 23, 2021

(51) Int. Cl.
*B64D 11/06*    (2006.01)
(52) U.S. Cl.
CPC .............................. *B64D 11/0638* (2014.12)
(58) Field of Classification Search
CPC ........ B64D 11/0638; B60N 3/007; A47C 7/68
(Continued)

(56) References Cited

U.S. PATENT DOCUMENTS 80,106 A * 7/1868 Abbott et al. ......... B60N 3/004
297/163
3,615,118 A    10/1971 Buxton
(Continued)

FOREIGN PATENT DOCUMENTS

DE       3942629 A1 * 6/1991
DE  202010002083 U1 * 7/2011 ............. B60N 3/004
WO    2017095477 A1    6/2017

OTHER PUBLICATIONS

International Patent Application No. PCT/US2018/052865, Invitation to Pay Additional Search Fee and Partial Search Report, dated Jun. 13, 2019.
(Continued)

*Primary Examiner* — Jose V Chen
(74) *Attorney, Agent, or Firm* — Kilpatrick Townsend & Stockton LLP

(57) ABSTRACT

A multi-latch assembly may be utilized, for example, in an aircraft passenger seat to hold separately deployable components such as a tray table and secondary member for separately supporting a personal entertainment device. The multi-latch assembly can include a first latch member and a second latch member. The first latch member can include a first arm. The first latch member can further include a first shaft that extends from the first arm and that is at least partially hollow. The second latch member can include a second arm. The second latch member can further include a second shaft that extends from the second arm and that is received within the first shaft of the first latch member so that the first arm and the second arm are rotatable independently of one another.

21 Claims, 8 Drawing Sheets

(58) Field of Classification Search
USPC ........................................................ 297/163
See application file for complete search history.

(56) References Cited

U.S. PATENT DOCUMENTS

| | | | | |
|---|---|---|---|---|
| 4,726,621 A * | 2/1988 | Muller | ................... | B61D 33/00 297/146 |
| 4,836,602 A * | 6/1989 | d'Almada Remedios | ................... | B64D 11/0007 297/146 |
| 6,494,533 B1 * | 12/2002 | Bohler | ................... | B60N 3/004 297/188.05 |
| 10,391,951 B2 * | 8/2019 | Matthews | ............... | B60R 11/02 |
| 2015/0108798 A1 * | 4/2015 | Boyer, Jr. | ............... | B60N 3/004 297/188.05 |
| 2016/0039525 A1 * | 2/2016 | Pajic | ................. | B64D 11/0015 108/44 |
| 2016/0143435 A1 * | 5/2016 | Kim | ...................... | A47B 23/00 248/447.1 |
| 2016/0274674 A1 * | 9/2016 | Valdes | ............. | B64D 11/00152 |
| 2016/0332550 A1 * | 11/2016 | Stewart | .................... | A47B 5/02 |
| 2016/0362917 A1 | 12/2016 | Cumbo | | |
| 2017/0036766 A1 * | 2/2017 | Dall'Era | ............ | B64D 11/0638 |
| 2018/0319306 A1 * | 11/2018 | Newbold | ............... | B60N 3/004 |
| 2019/0283881 A1 * | 9/2019 | Colletti | ............ | B64D 11/00152 |
| 2020/0148081 A1 * | 5/2020 | Marais | ...................... | B60N 2/43 |
| 2020/0172250 A1 * | 6/2020 | Drenzeck | ........... | B64D 11/0636 |
| 2021/0039793 A1 * | 2/2021 | Vipula | ............... | B64D 11/0642 |
| 2021/0347486 A1 * | 11/2021 | Arroum | ............. | B64D 11/0638 |

OTHER PUBLICATIONS

International Patent Application No. PCT/US2018/052865, International Search Report and Written Opinion, dated Aug. 5, 2019.

* cited by examiner

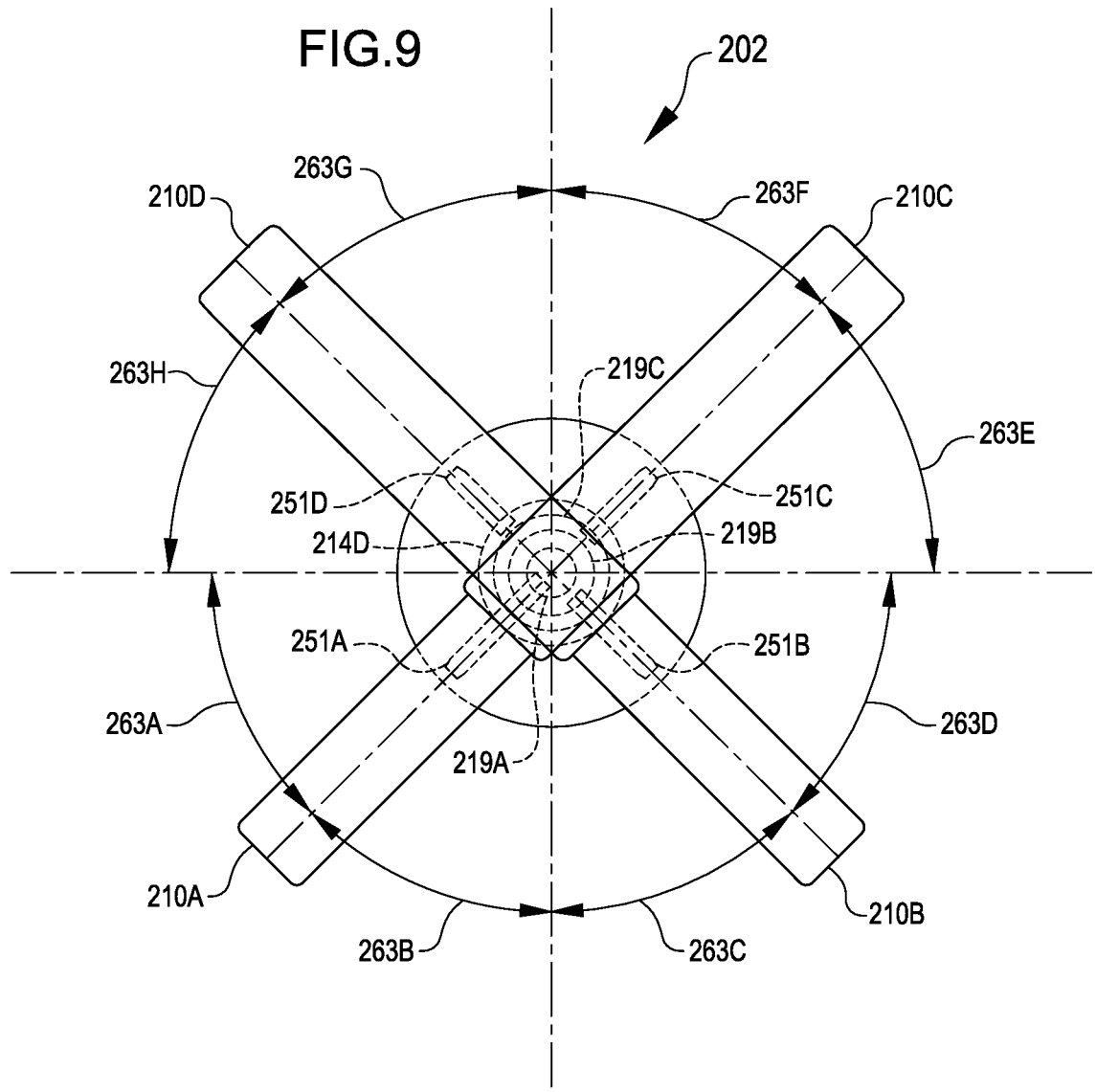

MULTI-LATCH ASSEMBLY FOR SELECTIVE RETENTION OF AIRCRAFT PASSENGER TRAY TABLE AND/OR OTHER DEPLOYABLE COMPONENTS

FIELD OF THE INVENTION

The field of the invention relates generally to latch assemblies, and more particularly (although not necessarily exclusively) to latch assemblies that may be implemented to releasably retain passenger seat tray table assemblies and/or other components in aircrafts or other passenger vehicles.

BACKGROUND

Tray tables are widely used in most aircraft seat assemblies. The tray table sub-assembly is typically pivoted on a pair of arms which allows the tray table to swivel between deployed and stowed positions, for example, relative to the back of the aircraft seat. This can provide a convenient table for a person sitting in a position facing the rear of the seat, such as a passenger situated aft of a forward-facing seat. When deployed, tray tables may be used as a surface for supporting food, drink, or other items, such as for work or entertainment during travel. The pivoting nature of the tray table may be useful in allowing the tray table to be readily deployed when desired by a seated passenger or readily stowed, such as to facilitate egress or ingress relative to the seat.

Different latch assemblies exist for retaining tray table assemblies in an upright stowed position when not in use. Various latch assemblies include either a lever (e.g., which may be rotated around an axis) or a slider (e.g., which may move linearly) that may be moved over a portion of a tray table assembly in the upright stowed position. In such a configuration, the lever or the slider can obstruct the pivoting motion of the tray table assembly. In many cases, the lever or slider can stop the tray table assembly from further movement after the tray table assembly has been pivoted to an upright stowed position against the rear of the seat.

Such latch assemblies may be subject to certain drawbacks or limitations, however. For example, a lever or slider may add additional weight to an aircraft, which is desirably avoided. Indeed, small differences in weight between one latch assembly and another may in the aggregate add up to a significant sum that may affect fuel efficiency or other performance metrics when implemented across a large number of seats within an aircraft.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat includes a seat back, a tray table, a secondary member, and a multi-latch assembly. The tray table can be moveable between a stowed table position along the seat back and a deployed table position. The secondary member can be separate from the tray table and moveable between a stowed member position along the seat back and a deployed member position. The multi-latch assembly can independently secure the tray table in the stowed table position and independently secure the secondary member in the stowed member position. The multi-latch assembly can include a housing, a first shaft, a first arm, a second shaft, and a second arm. The housing can be coupled with or can form a part of a portion of the seat back between the tray table and the secondary member. The first shaft can be received in the housing and define a first opening along a central axis of the first shaft. The first arm can extend angled away from the first shaft and be pivotable in response to rotation of the first shaft. The second shaft can be received in the first opening of the first shaft. The second arm can extend angled away from the second shaft and be pivotable in response to rotation of the second shaft.

In some embodiments, the second arm is pivotable independently of rotation of the first shaft such that the first arm is independently pivotable between retaining and releasing one of the tray table or the secondary member and such that the second arm is independently pivotable between retaining and releasing the other of the tray table or the secondary member.

In some embodiments, the housing includes an inner surface sized and arranged as a bearing surface for an exterior of the first shaft.

In some embodiments, the first shaft includes an inner surface having at least a portion sized and arranged as a bearing surface for at least a portion of an exterior of the second shaft.

According to certain embodiments of the present invention, a multi-latch assembly includes a first latch member and a second latch member. The first latch member can include a first arm. The first latch member can further include a first shaft that extends from the first arm and that is at least partially hollow. The second latch member can include a second arm. The second latch member can further include a second shaft that extends from the second arm and that is received within the first shaft of the first latch member so that the first arm and the second arm are rotatable independently of one another.

In some embodiments, the first latch member and the second latch member are coupled with or incorporated into a passenger seat and arranged such that a tray table of the passenger seat is releasably retained by operation of the first latch member or the second latch member.

In some embodiments, the multi-latch assembly further includes a housing. The housing can include a first wall having a first passage sized to receive the first shaft. The housing can further include a second wall having a second passage sized to receive a portion of the second shaft that extends beyond an end of the first shaft.

In some embodiments, the multi-latch assembly further includes at least one biasing mechanism configured to bias at least one of the first arm or the second arm away from the second wall.

In some embodiments, the multi-latch assembly further includes a retainer coupled with the second shaft to prevent movement of an end of the second shaft through the second passage toward the first wall.

In some embodiments, the multi-latch assembly further includes a first detent assembly configured to provide a first plurality of predetermined stops for the first latch member.

In certain embodiments, the first detent assembly includes a first projection and a first plurality of grooves. The first projection can extend from an outer surface of the first shaft. The first plurality of grooves can be positioned in the first wall of the housing and shaped to respectively receive the first projection at respective different positions corresponding to respective different predetermined stops of the first latch member.

In certain embodiments, the multi-latch assembly further includes a second detent assembly configured to provide a second plurality of predetermined stops for the second latch member. The second detent assembly can include a second projection and a second plurality of grooves. The second projection can extend from an outer surface of the second shaft. The second plurality of grooves can be positioned in the second wall of the housing and shaped to respectively receive the second projection at respective different positions corresponding to respective different predetermined stops of the second latch member.

In some embodiments, the multi-latch assembly further includes a first biasing mechanism configured to bias the first projection toward the first wall. The multi-latch assembly can also include a second biasing mechanism configured to bias the second projection toward the second wall.

In some embodiments, the first shaft further includes an inward extension extending away from an outer periphery of the first shaft, and the first biasing mechanism can be positioned between the second wall and the inward extension of the first shaft.

In some embodiments, the second shaft further includes an outward extension extending away from a central axis of the second shaft, and the second biasing mechanism can be positioned between the inward extension of the first shaft and the outward extension of the second shaft.

In some embodiments, the multi-latch assembly further includes a third latch member including a third arm and a third shaft that extends from the third arm and that is received within the second shaft so that the third arm is rotatable independently of the first arm and the second arm.

According to certain embodiments of the present invention, a method of assembling a multi-latch assembly can include inserting a first shaft through a first passage of a first wall of a housing so that a first arm extending angled away from the first shaft remains outside the first wall. The method can also include inserting a second shaft into an axial opening of the first shaft. The method can also include moving the second shaft through the axial opening of the first shaft, beyond the first wall of the housing, and into a second passage of a second wall of the housing so that a second arm extending angled away from the second shaft remains outside the first wall.

In some embodiments, the method further includes moving the second shaft through the second passage of the second wall of the housing so that a distal end of the second shaft extends through the second wall. The method can also further include coupling a retainer at or adjacent the distal end of the second shaft to prevent or inhibit movement of the distal end of the second shaft through the second passage toward the first wall.

In some embodiments, the method further includes pre-inserting a first biasing mechanism into a distal end of the first shaft to result in placement of the first biasing mechanism in between the second wall of the housing and an inward extension of the first shaft extending away from an outer periphery of the first shaft. The method can also further include pre-inserting a second biasing mechanism into a proximal end of the first shaft to result in placement of the second biasing mechanism in between the inward extension of the first shaft and an outward extension of the second shaft extending away from a central axis of the second shaft.

In some embodiments, the method further includes inserting a first pin of a first detent assembly into a first mounting hole in the first shaft at a position located between the first wall and the second wall of the housing so as to facilitate the first pin engaging respective grooves on the first wall to provide respective predetermined stops for the first arm. The method can also further include inserting a second pin of a second detent assembly into a second mounting hole located in a portion of the second shaft extending away from the first wall and beyond the second wall so as to facilitate the second pin engaging respective grooves on the second wall to provide respective predetermined stops for the second arm.

BRIEF DESCRIPTION OF THE DRAWINGS

FIG. 9 is a front view of the multi-latch assembly of FIG. 8.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

This disclosure provide a multi-latch assembly for passenger seats. While the multi-latch assemblies are discussed for use with aircraft seats, they are by no means so limited. Rather, embodiments of the multi-latch assemblies may be used in passenger seats or other seats of any type or otherwise as desired. For example, embodiments may be used on trains, buses, movie theaters, student seating, or any other instance when a tray table on a forward structure may be useful. Additionally or alternatively, embodiments may be used in galleys, lavatories, or other areas of aircraft or other passenger vehicles.

In various embodiments, the multi-latch assemblies may allow multiple deployable components to be independently and releasably retained by sub-parts of the multi-latch assembly. For example, in various embodiments, the multi-latch assembly includes a first arm and a second arm that are independently pivotable about a shared central axis to individually secure or release respective distinct deployable components such as a tray table and a secondary shelf for a personal entertainment device. The shared central axis may be defined, for example, through a housing situated between a first deployable component (such as a tray table) and a second deployable component (such as a secondary shelf). Such intermediate placement may allow the first arm to be pivoted between respective positions blocking and permitting movement of the first deployable component regardless of which position the second arm is in between blocking or permitting movement of the second deployable component. In various embodiments, independent rotation about a shared axis may be achieved by the first arm being supported by a tubular shaft that in turn receives a second shaft that supports the second arm. More generally, in various embodiments, utilizing multi-latch assemblies to independently releasably retain separate deployable components may avoid a need to supply separate latch assemblies for each deployable component and/or otherwise result in weight reduction, cost savings, and/or other operational benefits.

Figure 1:
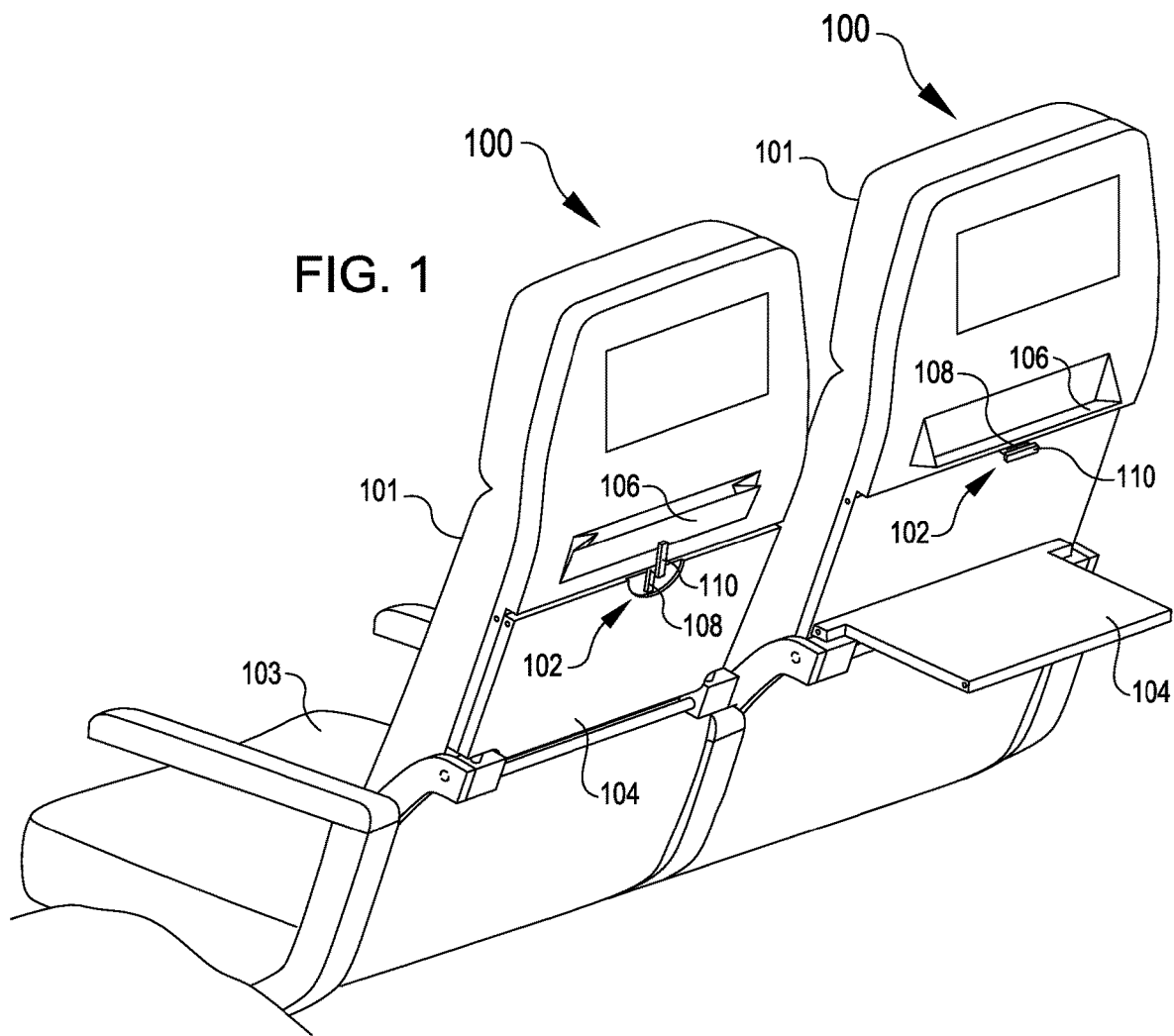
FIG. 1 is a perspective rear view of a pair of seats each having a multi-latch assembly for individually and releasably retaining a tray table and a secondary member in respective stowed positions, according to certain embodiments of the present disclosure.

According to certain embodiments of the present disclosure, as shown in FIG. 1, a seat 100 may include a multi-latch assembly 102. Two instances of the seat 100 are shown adjacent one another in FIG. 1 for ease of viewing different states of respective components. For example, at left in FIG. 1, the multi-latch assembly 102 is shown independently and releasably retaining both a tray table 104 and a secondary member 106. In contrast, at right in FIG. 1, the multi-latch assembly 102 has been manipulated to permit respective movement of each of the tray table 104 and the secondary member 106.

The illustrated seat 100 includes a seat back 101 and a seat pan 103. The seat back 101 and seat pan 103 form the primary surfaces for supporting a passenger in the seat 100. The seat pan 103 may be oriented substantially horizontally, for example, to provide a suitable surface for receiving the thighs and buttocks of a seated passenger. The seat back 101 may be oriented substantially vertically, for example, to provide a suitable surface for receiving a back, neck, and head of a seated passenger. The seat back 101 may recline in various embodiments, for example, to allow different options for supporting passengers in seated, prone, or other positions.

In various embodiments, the seat pan 103 and the front of the seat back 101 include non-rigid or pliable materials (e.g., fabric, textiles, foam, or other cushioning material) for the comfort of passengers when supported in the seat 100. Other more rigid materials may also be included, such as to reinforce pliable materials, or to provide components for other functions. For example, the seat back 101 on a rear side may include a shroud that is formed from rigid material and that is coupled with cushioning material of the seat back 101. Suitable examples of rigid material that may be used for the shroud and/or other components described herein include, but are not limited to, aluminum, stainless steel, aramid fibers, polycarbonate, polypropylene, other metallic materials, composite materials, or other similar materials.

A first arm 108 and a second arm 110 of the multi-latch assembly 102 are visible in FIG. 1. The first arm 108 and the second arm 110 can be movable independent of one another. In FIG. 1, the first arm 108 is shown offset behind the second arm 110, e.g., such that the second arm 110 can be positioned overlaying the first arm 108, such as depicted at right in FIG. 1. For clarity and conciseness, discussion below will mainly focus on the first arm 108 being operable for affecting the tray table 104 and the second arm 110 being operable for affecting the secondary member 106. However, embodiments are not restricted to such relationships. For example, in some embodiments the first arm 108 may additionally or alternatively affect the secondary member 106 or other moveable component, and the second arm 110 may additionally or alternatively affect the tray table 104 or other moveable component.

The tray table 104 can be moveable between a stowed table position along the seat back 101 (e.g., as at left in FIG. 1) and a deployed table position in which the tray table 104 is deployed at least partially away from the seat back 101 (e.g., as at right in FIG. 1). For example, the tray table 104 may function in the deployed table position as a flat surface for a passenger to place food, beverages, or other items when desired. The tray table 104 may be secured in the stowed table position, e.g., to facilitate ingress or egress from the seat 100 or to otherwise provide more free space about the passenger.

The secondary member 106 can be separate from the tray table 104. The secondary member 106 can be moveable between a stowed member position along the seat back 101 (e.g., as at left in FIG. 1) and a deployed member position in which the secondary member 106 is deployed at least partially away from the seat back 101 (e.g., as at right in FIG. 1). In some embodiments, the secondary member 106 may correspond to a shelf or other support surface for supporting a personal entertainment device such as a book, magazine, mobile phone, or tablet. The secondary member 106 may additionally or alternatively correspond to a cup holder, pouch, or other component deployable from the seat back 101 and distinct from the tray table 104.

The first arm 108 may function to releasably secure the tray table 104 in the stowed table position. For example, the first arm 108 may be positioned in a first securing position (e.g., as at left in FIG. 1) to at least partially cover at least a portion of the tray table 104. This may block a path of travel of the tray table 104 between the stowed table position and the deployed table position. The first arm 108 may additionally be moved to a first released position (e.g., as at right in FIG. 1) in which the first arm 108 exposes or otherwise no longer covers the tray table 104. This may permit movement along a path of travel of the tray table 104 between the stowed table position and the deployed table position. The first arm 108 may move between the first securing position and the first released position, for example, by rotating. This rotation may be independent of whether or not the second arm 110 also rotates.

The second arm 110 may function to releasably secure the secondary member 106 in the stowed member position. For example, the second arm 110 may be positioned in a second securing position (e.g., as at left in FIG. 1) to at least partially cover at least a portion of the secondary member 106. This may block a path of travel of the secondary member 106 between the stowed member position and the deployed member position. The second arm 110 may additionally be moved to a second released position (e.g., as at right in FIG. 1) in which the second arm 110 exposes or otherwise no longer covers the secondary member 106. This may permit movement along a path of travel of the secondary member between the stowed member position and the deployed member position. The second arm 110 may move between the second securing position and the second released position, for example, by rotating. This rotation may be independent of whether or not the first arm 108 also rotates.

FIGS. 2-6 show examples of elements that may be included in the multi-latch assembly 102 and illustrate such components apart from the seat 100. Generally, the multi-latch assembly 102 is shown in an assembled state in FIGS. 2, 3, 4, and 6 (e.g., with FIGS. 2 and 3 being front and rear perspective views, FIG. 4 being a front view, and FIG. 6 being a cutaway side view) and with components in an unassembled state in FIG. 5, in which components are separated from one another for ease of viewing.

Figure 2:
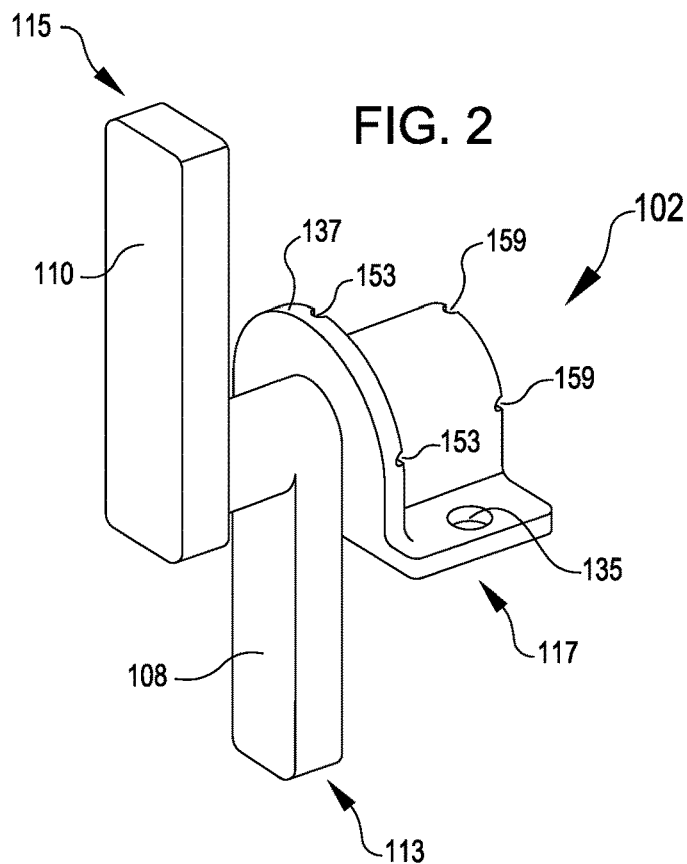
FIG. 2 is a front perspective view of a multi-latch assembly in isolation, according to certain embodiments of the present disclosure.
Figure 3:
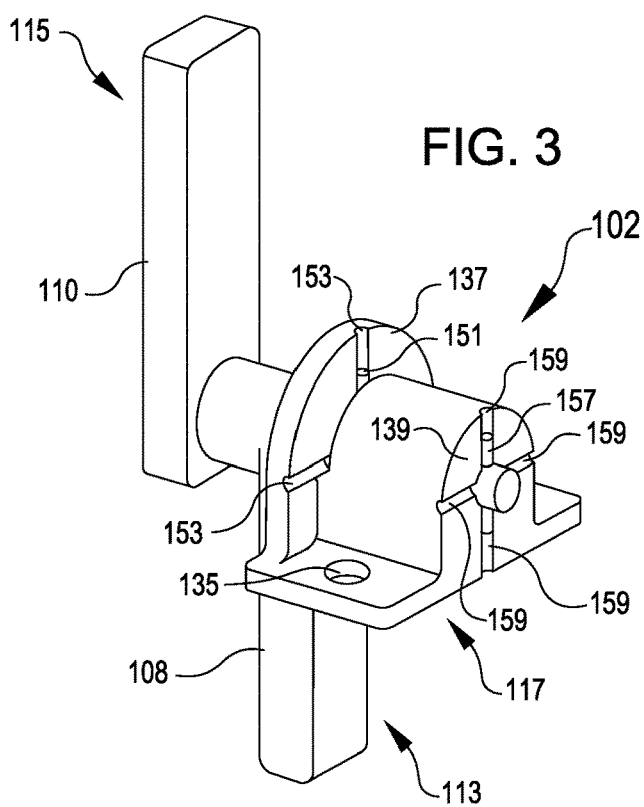
FIG. 3 is a rear perspective view of the multi-latch assembly of FIG. 2.

Referring for example, to FIGS. 2 and 3, the multi-latch assembly 102 can include a first latch member 113 and a second latch member 115. The multi-latch assembly 102 can also include a housing 117. In operation, the housing 117 may receive and support the first latch member 113 and the second latch member 115 and permit each to rotate independently relative to the housing 117.

Figure 5:
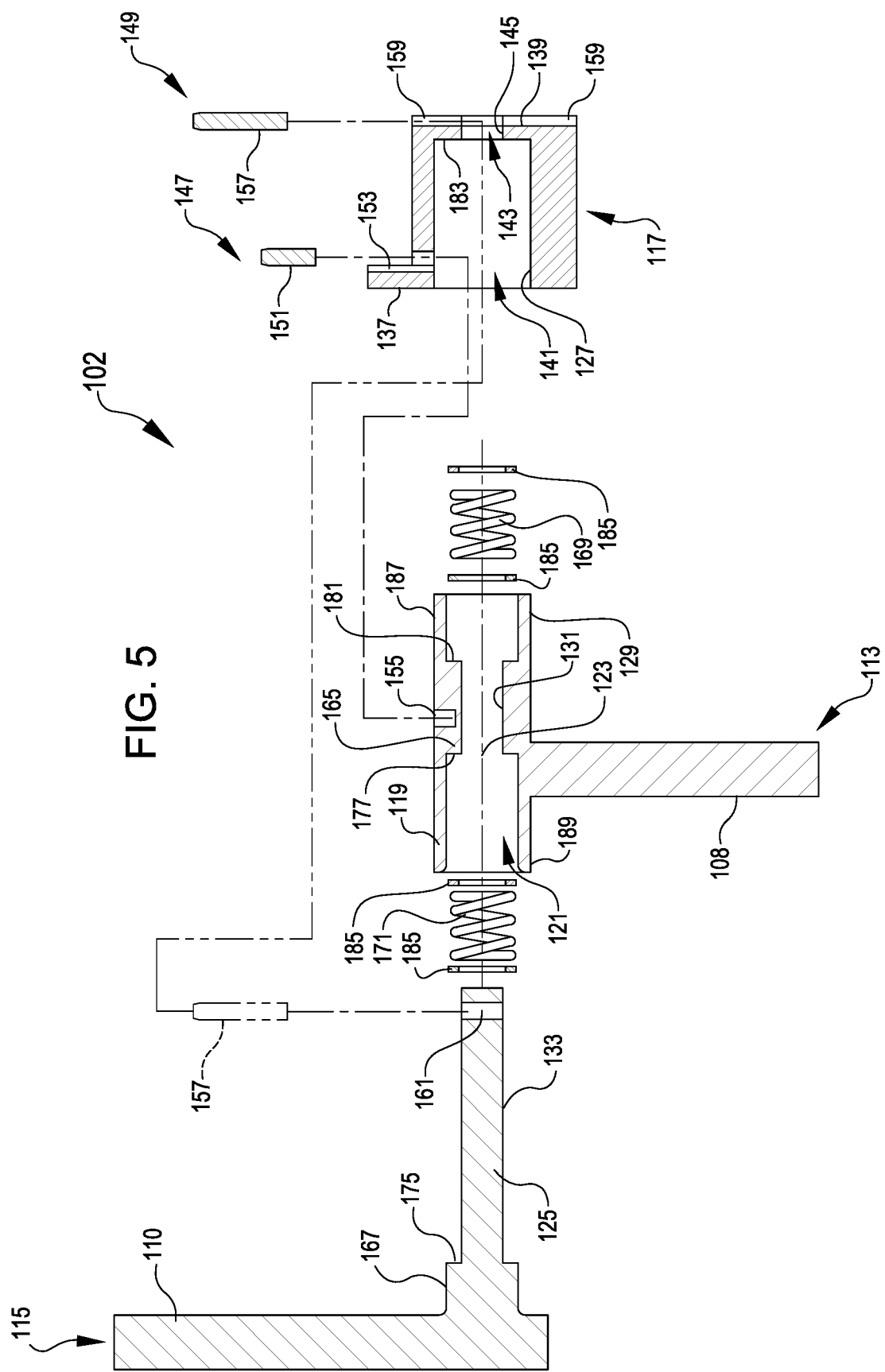
FIG. 5 is an exploded assembly view of the multi-latch assembly of FIGS. 2-4.

As may be best shown in FIG. 5, the first latch member 113 can include a first shaft 119 and the first arm 108. These subcomponents can be arranged such that the first shaft 119 extends from the first arm 108. For example, the first shaft 119 and the first arm 108 can be arranged perpendicularly to one another or angled away from each other at any other suitable orientation. The first shaft 119 and the first arm 108 can be integrally formed as a single piece or otherwise coupled together in any suitable fashion. More generally, the first arm 108 can be pivotable in response to rotation of the first shaft 119.

The first shaft 119 can be at least partially hollow. For example, the first shaft 119 can have a body that defines a first opening 121 along a central axis 123 of the first shaft 119.

The second latch member 115 can include a second shaft 125 and the second arm 110. These subcomponents can be arranged such that the second shaft 125 extends from the second arm 110. For example, the second shaft 125 and the second arm 110 can be arranged perpendicularly to one another or angled away from each other at any other suitable orientation. The second shaft 125 and the second arm 110 can be integrally formed as a single piece or otherwise coupled together in any suitable fashion. More generally the second arm 110 can be pivotable in response to rotation of the second shaft 125.

The first latch member 113 and the second latch member 115 can be sized relative to one another to facilitate engagement of features of one another. For example, the first opening 121 of the first shaft 119 can be sized for receiving part of the second latch member 115, such as the second shaft 125. Similarly, the second shaft 125 may be sized to be received within the central opening 121. For example, in operation, the second shaft 125 may be received within the first shaft 119 of the first latch member 113 so that the first arm 108 and the second arm 110 are rotatable independently of one another.

The housing 117 may support the first latch member 113, for example, with the second latch member 115 received within the first latch member 113. Hence, the housing 117 may ultimately support both the first latch member 113 and the second latch member 115.

The housing 117 may be situated in an appropriate location to allow the first latch member 113 and the second latch member 115 to independently secure distinct deployable components. For example, the housing 117 may be coupled with or form a part of a portion of the seat back 101 between the tray table 104 and the secondary member 106. As may best be seen, for example, in FIGS. 2 and 3, the housing 117 can include mounting interfaces 135 to facilitate connection of the housing 117 with other structures for placement of the housing relative to separate deployable components. In FIGS. 2 and 3, mounting interfaces 135 are depicted as openings for fasteners through flanges, although any other suitable mounting interface 135 may additionally or alternatively be utilized. Additionally or alternatively, features of the housing 117 may be integrally formed into other structures, for example, without separate mounting interfaces 135.

The housing 117 can include various walls that may engage other components of the multi-latch assembly 102. For example, as may be best seen in FIG. 5, the housing 117 can include a first wall 137 and a second wall 139. The first wall 137 can have a first passage 141 sized to receive the first shaft 119. The second wall 139 can have a second passage 143 sized to receive a portion of the second shaft 125. For example, the second passage 143 may receive a portion of the second shaft 125 that extends beyond an end of the first shaft 119 when the multi-latch assembly 102 is fully assembled (e.g., FIG. 6). The first wall 137 and the second wall 139 can be spaced apart from one another, for example, with the second wall 139 positioned behind the first wall 137 in a direction away from the first arm 108 and the second arm 110 of the multi-latch assembly 102.

Suitable bearing surfaces can be included in the multi-latch assembly 102 to facilitate movement of respective components. As one example, as may best be seen in FIG. 5, the housing 117 can include an inner surface 127 sized and arranged as a bearing surface for an exterior 129 of the first shaft 119. For example, the inner surface 127 of the housing 117 may permit the first shaft 119 to rotate freely within the housing 117 and/or otherwise provide support against the exterior 129 of the first shaft 119, such as for maintaining positioning of the first shaft 119. The inner surface 127 that serves as a bearing surface may be positioned at least partially in a part of the first wall 137 that defines the first passage 141.

As another example, the first shaft 119 can include an inner surface 131 having at least a portion sized and arranged as a bearing surface for at least a portion of an exterior 133 of the second shaft 125. As a further example, at least a portion of the second wall 139 that defines the second passage 143 may include an inner surface 145 that serves as a bearing surface for the second shaft 125 (e.g., a portion of the second shaft 125 that extends beyond the end of the first shaft 119).

The multi-latch assembly 102 can include features to allow the first arm 108 and the second arm 110 to be maintained at positions to which they are moved in use. In some embodiments, such functionality may be provided by a friction fit of respective components that may resist movement in response to minor forces (such as exertion of gravity or incidental contact with components) and yet permit movement in response to larger forces (such as may readily be exerted by a passenger in use when intended). In some embodiments, additional parts may be included to facilitate maintaining the first arm 108 and the second arm 110 at particular positions. For example, as may be best seen in FIG. 5, the multi-latch assembly 102 can include a first detent assembly 147 to provide a first plurality of predetermined stops for the first latch member 113, and/or a second detent assembly 149 to provide a plurality of predetermined stops for the second latch member 115.

The first detent assembly 147 as depicted includes a first projection 151 and a first plurality of grooves 153. The first projection 151 can extend from the outer surface 129 of the first shaft 119. For example, as may best be seen in FIG. 5, the first projection 151 may correspond to a pin that may be mounted in or through a hole 155 in the outer surface 129 of the first shaft 119. As may be best seen in FIGS. 2 and 3, the first plurality of grooves 153 can be positioned in the first wall 137 of the housing 117 and shaped to respectively receive the first projection 151 at respective different positions corresponding to respective different predetermined stops of the first latch member 113. For example, with reference to the view in FIG. 3, the first arm 108 may be rotated upwardly and to the right and cause the first projection 151 to exit an upwardly-directed groove 153 and travel along the rear of the first wall 137 until engaging a leftwardly orientated groove 153 and causing the first arm 108 to stop at a corresponding predetermined location.

The second detent assembly 149 as depicted includes a second projection 157 and a second plurality of grooves 159. The second projection can extend from the outer surface 133 of the second shaft 125. For example, as may best be seen in FIG. 5, the second projection 157 may correspond to a pin that may be mounted in or through a hole 161 in the outer surface 133 of the second shaft 125. As may be best seen in FIGS. 2 and 3, the second plurality of grooves 159 can be positioned in the second wall 139 of the housing 117 and shaped to respectively receive the second projection 157 at respective different positions corresponding to respective different predetermined stops of the second latch member 115.

Figure 4:
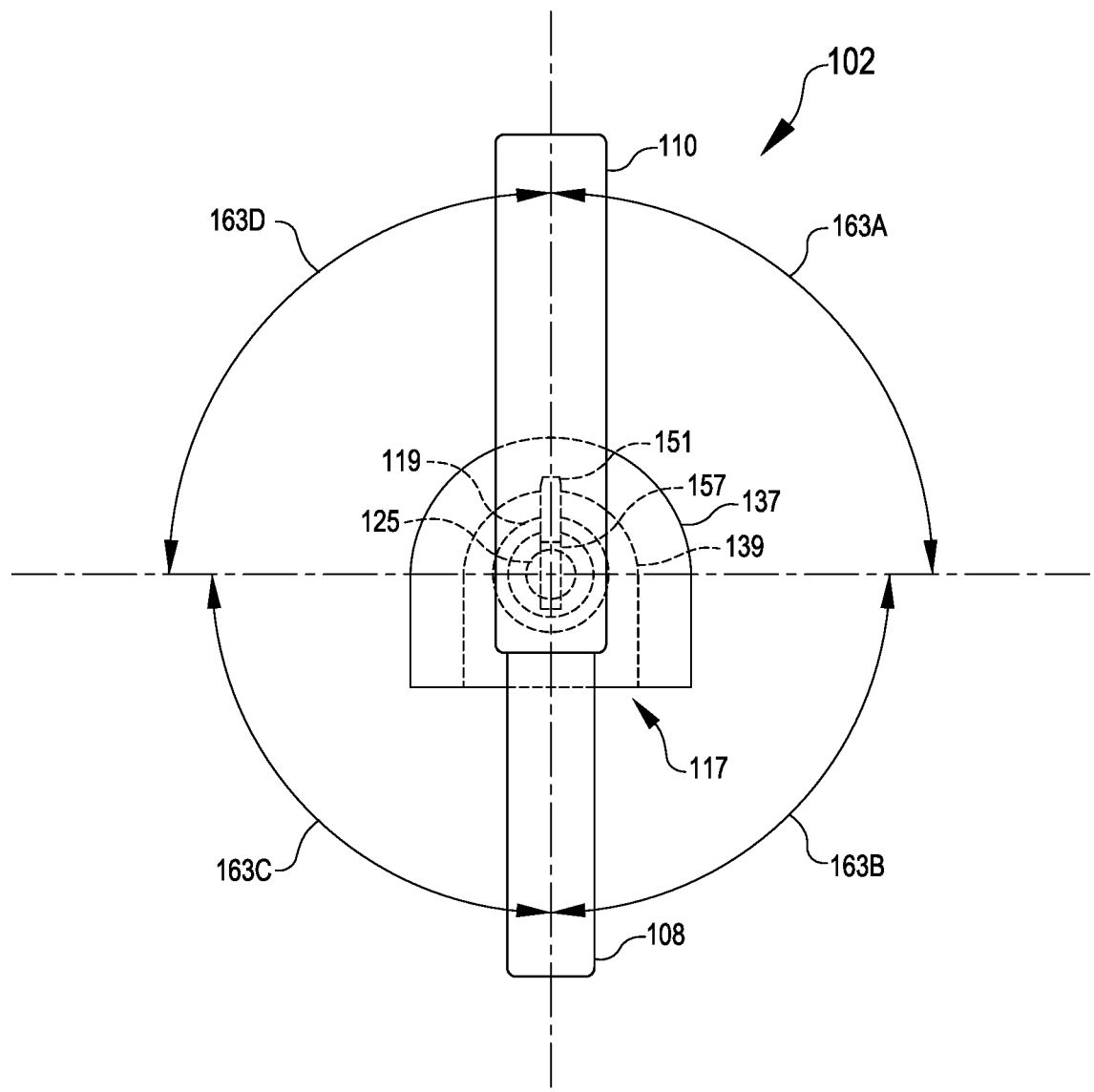
FIG. 4 is a front view of the multi-latch assembly of FIGS. 2 and 3.

Some examples of movements between predetermined stops are illustrated in FIG. 4. For example, movements illustrated by arrows 163 (distinguished by respective suffixes A, B, C, and D) in FIG. 4 may correspond to movements bounded by the particular arrangement of the first plurality of grooves 153 and the second plurality of grooves 159 depicted in FIG. 3. As an illustrative example, the movement depicted by arrow 163C in FIG. 4 may correspond to a movement of the first arm 108 between predetermined stops determined by engagement of the first projection 151 with the respective two grooves 153 visible in FIG. 3. As another illustrative example, the movements depicted by arrows 163A, 163B, 163C, and 163D in FIG. 4 may correspond to a movement of the second arm 110 at quarter turns between predetermined stops determined by engagement of the second projection 157 with successive grooves of the second plurality of grooves 159 visible in FIG. 3.

Additionally, although the first detent assembly 147 and the second detent assembly 149 (e.g., FIG. 5) have each been described by way of example with a specific arrangement of a pin and grooves, other arrangements are possible. For example, although quarter turns are depicted in FIG. 4, any other suitable angle of rotation between predetermined stops could be implemented, such as by altering a number and/or placement of features of the first detent assembly 147 and/or the second detent assembly 149. Moreover, ball detent members could be used along with or instead of pin detent members. Additionally or alternatively, relative arrangement of projections and grooves may be altered or swapped, e.g., such that a groove is carried by a shaft (such as the first shaft 119 or second shaft 125) and a projection is carried by a corresponding wall (such as the first wall 137 or the second wall 139).

Furthermore, although FIG. 5 depicts the first shaft 119 only partially penetrated by the hole 155 for receiving the first projection 151 and also depicts the second shaft 125 fully penetrated all the way through by the hole 161 for receiving the second projection 157, other variations are possible. For example, other depths and/or degrees penetration could be utilized. In some embodiments, the second projection 157 may extend only from one side of second shaft 125, rather than out both sides of the second shaft 125, for example. In some embodiments, a respective projection may be integrally formed as part of a shaft instead of being a pin that is received by the shaft.

Figure 6:
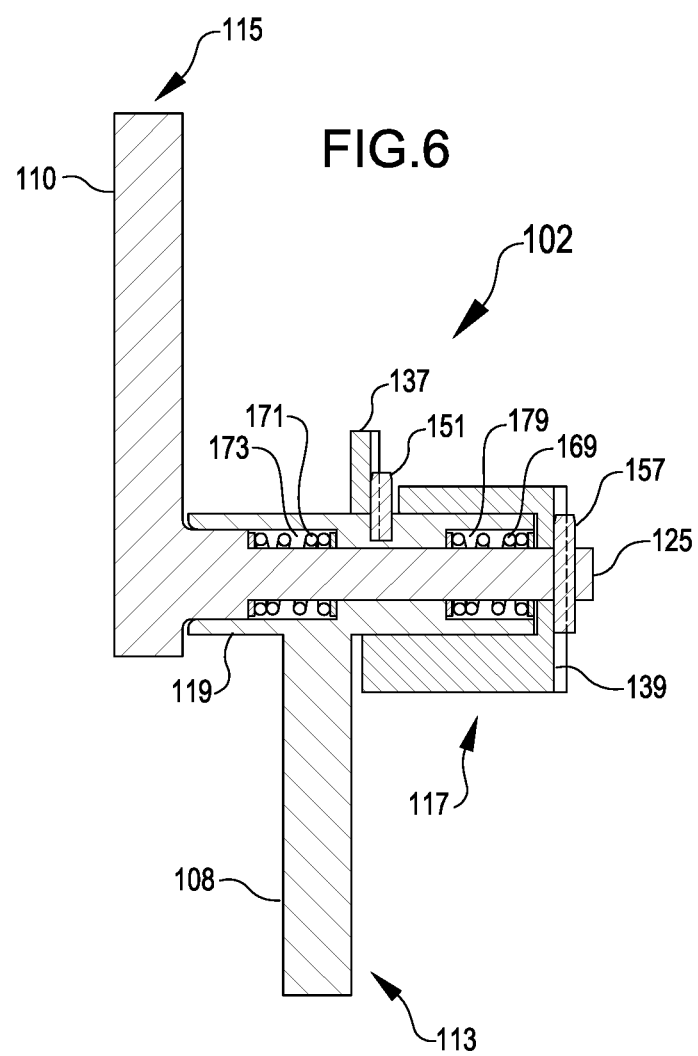
FIG. 6 is a cutaway side view of the multi-latch assembly of FIGS. 2-4.

In some embodiments, the pin for forming the second projection 157 (e.g., FIG. 5) may additionally or alternatively function as a retainer coupled with the second shaft 125 to prevent movement of an end of the second shaft 125 through the second passage 143 toward the first wall 137, e.g., as may be best appreciated with reference to FIG. 6. Additionally or alternatively, a different structure such as a threaded or unthreaded nut or other retainer may be included to provide or augment this function.

In some embodiments, the first shaft 119 and/or the second shaft 125 may include profiles that facilitate engagement between parts of the multi-latch assembly 102. For example, as may best be seen with reference to FIG. 5, the first shaft 119 may include an inward extension 165 that extends inwardly (e.g., away from an outer periphery of the first shaft 119 and/or toward the central axis 123). The inward extension 165 may define a constricted portion of the central opening 121 that has a smaller diameter than other portions of the central opening 121. In some embodiments, at least a portion of the inner surface 131 of the first shaft 119 that forms a bearing surface for the exterior 133 of the second shaft 125 may correspond to an inward-facing surface of the inward extension 165.

The second shaft 125 may include an outward extension 167 that extends outwardly (e.g., away from the central axis 123). The outward extension 167 may define an enlarged portion of the second shaft 125 that has a smaller diameter than other portions of the second shaft 125. The outward extension 167 may be sized to occupy a corresponding open end of the first opening 121 of the first shaft 119. In some embodiments, at least a portion of the outward extension 167 engages an interior of first shaft 119 as a bearing surface.

In some embodiments, the multi-latch assembly 102 can include biasing mechanisms, e.g., for positioning respective components relative to one another, such as for biasing at least one of the first arm 108 or the second arm 110 away from the second wall 139 of the housing 117. For example, as may be appreciated at least with respect to FIGS. 5 and 6, the multi-latch assembly 102 may include a first biasing mechanism 169 and a second biasing mechanism 171.

The first biasing mechanism 169 (e.g., as may best be seen in FIG. 6) may be situated in a first annular space 173 defined between portions of the first shaft 119 and the second shaft 125. For example, the first annular space 173 may be bounded at least in part by a rearward surface 175 (e.g., FIG. 5) of the outward extension 167 of the second shaft 125 and a forward surface 177 of the inward extension 165 of the first shaft 119.

The second biasing mechanism 171 (e.g., as may be best seen in FIG. 6) may be situated in a second annular space 179 defined between portions of the first shaft 119 and the second wall 139 of the housing 117. For example, the second annular space 179 may be bounded at least in part by a rearward surface 181 (e.g., FIG. 5) of the inward extension 165 of the first shaft 119 and a forward surface 183 of the second wall 139 of the housing 117.

In operation (e.g., as may be best appreciated with reference to FIG. 6), the first biasing mechanism 169 may bias the first projection 151 toward the first wall 137 of the housing 117. For example, such biasing may urge engagement between the first latch member 113 and the first wall 137 in a manner that may provide positive engagement for the predetermined stops for the first arm 108 and yet permit suitable flexibility to facilitate movement between the predetermined stops.

The second biasing mechanism 171 may bias the second projection 157 toward the second wall 139. For example, such biasing may urge engagement between the second latch member 115 and the second wall 139 in a manner that may provide positive engagement for the predetermined stops for the second arm 110 and yet permit suitable flexibility to facilitate movement between the predetermined stops.

In some embodiments, washers 185 may be included, e.g., to provide structure for facilitating placement and retention of the first biasing mechanism 169 and/or the second biasing mechanism 171 within the multi-latch assembly 102. Moreover, although the first biasing mechanism 169 and the second biasing mechanism 171 are each depicted as compression springs, either or both could include spring washers and/or any other suitable component for providing suitable biasing force.

A method of assembling the multi-latch assembly 102 will now be described with reference to FIG. 5. The method may include pre-inserting the first biasing mechanism 169 into a distal end 187 of the first shaft 119. This action may result (e.g., upon completion of the assembly of the multi-latch assembly 102) in placement of the first biasing mechanism 169 in between the second wall 139 of the housing 117 and the inward extension 165 of the first shaft 119 extending inwardly away from an outer periphery of the first shaft 119. The method may also include pre-inserting the second biasing mechanism 171 into a proximal end 189 of the first shaft 119. This action may result (e.g., upon completion of the assembly of the multi-latch assembly 102) in placement of the second biasing mechanism 171 in between the inward extension 165 of the first shaft 119 and the outward extension 167 of the second shaft 125 extending outwardly away from the central axis 123 of the second shaft 125.

The method may also include inserting the first shaft 119 through the first passage 141 of the first wall 137 of the housing 117. This action may result in the first arm 108 (e.g., extending angled away from the first shaft 119) remaining outside the first wall 137.

The method may also include inserting the second shaft 125 into the axial opening 121 of the first shaft 119. The second shaft 125 may be moved through the axial opening 121 of the first shaft 119, beyond the first wall 137 of the housing 117, and into the second passage 143 of the second wall 139 of the housing 117. This action may result in the second arm 110 (e.g., extending angled away from the second shaft 125) remaining outside the first wall 137.

The second shaft 125 may be moved through the second passage 143 of the second wall 139 of the housing 117 so that a distal end of the second shaft 125 extends through the second wall 139. A retainer (such as the pin 157) can be coupled at or adjacent the distal end of the second shaft 125 to prevent or inhibit movement of the distal end of the second shaft 125 through the second passage 143 toward the first wall 137.

The method may also include inserting the first pin 151 of the first detent assembly 147 into the first mounting hole 55 in the first shaft 119 at a position located between the first wall 137 and the second wall 39 of the housing 117. This action may facilitate the first pin 151 engaging respective grooves 153 on the first wall 137 to provide respective predetermined stops for the first arm 108.

The method may also include inserting the second pin 157 (e.g., which may be the same as or different from the retainer noted above) of the second detent assembly 149 into the second mounting hole 161 located in a portion of the second shaft 125 extending away from the first wall 137 and beyond the second wall 139. This action may facilitate the second pin 157 engaging respective grooves 159 on the second wall 139 to provide respective predetermined stops for the second arm 110.

Other variations are also possible. For example, in some embodiments, the multi-latch assembly may include more than two arms and/or latching members. Additionally, as noted above, multi-latch assemblies may be utilized in other contexts apart from passenger seats. Some examples of both variation in number of latches and context of latches are described beginning with reference to FIG. 7.

Figure 7:
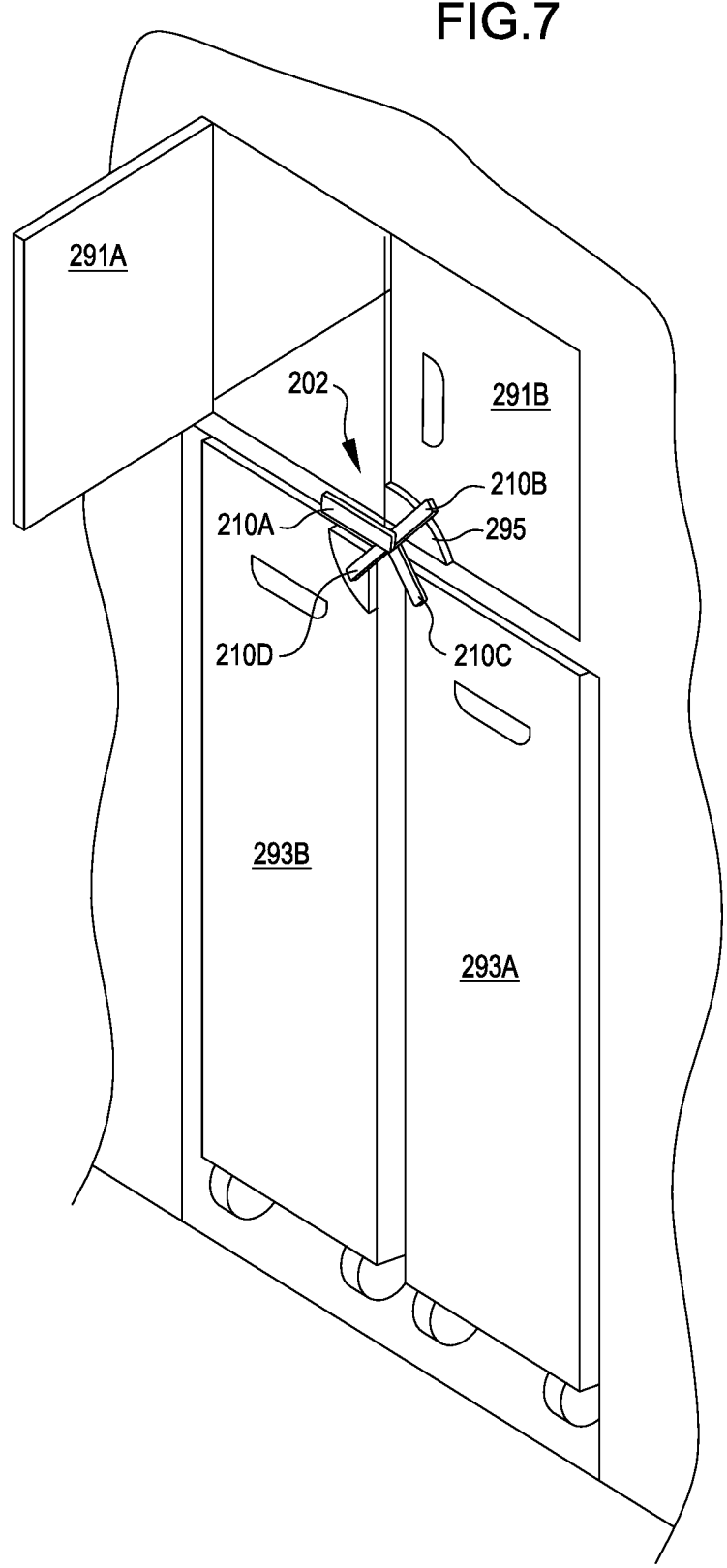
FIG. 7 is a perspective view of a multi-latch assembly implemented for individually and releasably retaining components such as a cabinet doors and/or service trolleys according to certain embodiments of the present disclosure.

FIG. 7 illustrates a multi-latch assembly 202 implemented relative to cabinet doors and service trolleys. The multi-latch assembly 202 can be an example of the multi-latch assembly 102 and may include similarly named features.

The multi-latch assembly 202 is shown in FIG. 7 having four arms 210, respectively identified as 210A, 210B, 210C, and 210D. Each of the arms 210 can be independently moved to individually retain a respective deployable component regardless of whether any of the other arms 210 are moved or not. For example, in the state depicted in FIG. 7, a first arm 210A has been rotated to allow a first cabinet door 291A to be deployed, while the remaining arms 210B, 210C, and 210D remain in place respectively retaining a second cabinet door 291B, a first trolley 293A, and a second trolley 293B in respective stowed positions.

The arms 210 may be offset or staggered from one another along a shared pivoting axis. To accommodate for such a difference in distances from a base of the multi-latch assembly 202, deployable features retained by the multi-latch assembly 202 may include bosses 295 or other raised surfaces.

Figure 8:
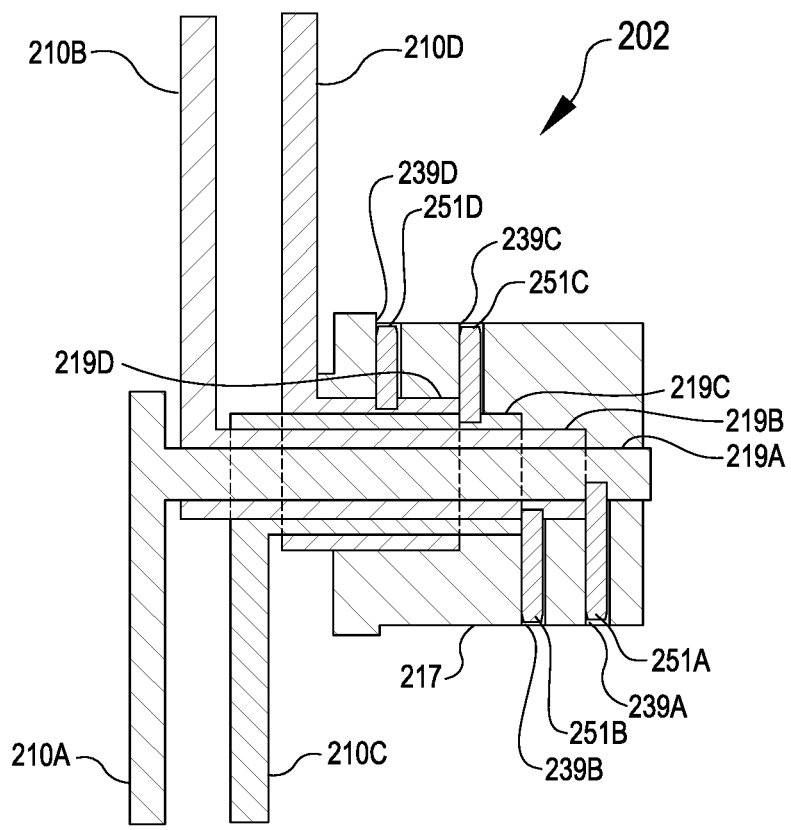
FIG. 8 is a cutaway side view of the multi-latch assembly of FIG. 7.

FIG. 8 is a cutaway side view of the multi-latch assembly 202. Each arm 210 may be coupled with a corresponding shaft 219. The shafts 219 may nest within one another. For example, the shaft 219A may be received within the shaft 219B, which may be received within the shaft 219C, which may be received within the shaft 219D, which may be received within the housing 217. In effect, additional shafts 219 and corresponding arms 210 may be added by expanding the number of nested components.

Respective pins or other detent members 251 may be respectively coupled with the shafts 219, for example, to provide predetermined stops such as through positive engagement. Each detent member 251 may engage a respective wall or slot 239 of the housing 217. In the depicted arrangement, each detent member 251 avoids interfering with other shafts 219 as a result of the respective ends of the shafts being staggered (e.g., stair-stepped) from one another during progression through the housing. In some embodiments, the shafts 219 may additionally or alternatively include slits through which detent members 251 of other shafts 219 may extend and move between respective predetermined stops.

The multi-latch assembly 202 is depicted in FIG. 8 without biasing mechanisms similar to those identified at 169 and 171 in earlier figures, although such structures may be included (e.g., with corresponding engagement surfaces) as desired. Features along the walls or slots 239 may be distributed in any suitable arrangement to obtain any desired amount of pivoting between predetermined stops (e.g., which may vary among different arms 210 if desired). As an illustrative example, FIG. 9 depicts an arrangement in which respective movements (depicted by arrows 263) are permitted between respective stops with angles between stops being every 45° instead of every 90° as in FIG. 4, although other distributions are also possible.

In the following, further examples are described to facilitate the understanding of the invention:

Example #1

A passenger seat (which may include features of any of the subsequent examples) comprising:
- a seat back;
- a tray table moveable between a stowed table position along the seat back and a deployed table position;
- a secondary member separate from the tray table and moveable between a stowed member position along the seat back and a deployed member position; and
- a multi-latch assembly configured to independently secure the tray table in the stowed table position and to independently secure the secondary member in the stowed member position, the multi-latch assembly comprising:
  - a housing coupled with or forming a part of a portion of the seat back between the tray table and the secondary member;
  - a first shaft received in the housing and defining a first opening along a central axis of the first shaft;
  - a first arm extending angled away from the first shaft and pivotable in response to rotation of the first shaft;
  - a second shaft received in the first opening of the first shaft; and
  - a second arm extending angled away from the second shaft and pivotable in response to rotation of the second shaft.

Example #2

The passenger seat of Example #1, or any of the preceding or subsequent examples, wherein the second arm is pivotable independently of rotation of the first shaft such that the first arm is independently pivotable between retaining and releasing one of the tray table or the secondary member and such that the second arm is independently pivotable between retaining and releasing the other of the tray table or the secondary member.

Example #3

The passenger seat of Example #1, or any of the preceding or subsequent examples, wherein the housing comprises an inner surface sized and arranged as a bearing surface for an exterior of the first shaft.

Example #4

The passenger seat of Example #1, or any of the preceding or subsequent examples, wherein the first shaft comprises an inner surface having at least a portion sized and arranged as a bearing surface for at least a portion of an exterior of the second shaft.

Example #5

A multi-latch assembly (which may include features of any of the preceding or subsequent examples) comprising:
- a first latch member comprising:
  - a first arm; and
  - a first shaft that extends from the first arm and that is at least partially hollow; and
- a second latch member comprising:
  - a second arm; and
  - a second shaft that extends from the second arm and that is received within the first shaft of the first latch member so that the first arm and the second arm are rotatable independently of one another.

Example #6

The multi-latch assembly of Example #5, or any of the preceding or subsequent examples, wherein the first latch member and the second latch member are coupled with or incorporated into a passenger seat and arranged such that a tray table of the passenger seat is releasably retained by operation of the first latch member or the second latch member.

Example #7

The multi-latch assembly of Example #5, or any of the preceding or subsequent examples, further comprising a housing comprising:
- a first wall having a first passage sized to receive the first shaft; and
- a second wall having a second passage sized to receive a portion of the second shaft that extends beyond an end of the first shaft.

Example #8

The multi-latch assembly of Example #7, or any of the preceding or subsequent examples, further comprising at least one biasing mechanism configured to bias at least one of the first arm or the second arm away from the second wall.

Example #9

The multi-latch assembly of Example #7, or any of the preceding or subsequent examples, further comprising a retainer coupled with the second shaft to prevent movement of an end of the second shaft through the second passage toward the first wall.

Example #10

The multi-latch assembly of Example #7, or any of the preceding or subsequent examples, further comprising a first detent assembly configured to provide a first plurality of predetermined stops for the first latch member.

Example #11

The multi-latch assembly of Example #10, or any of the preceding or subsequent examples, wherein the first detent assembly comprises:

a first projection extending from an outer surface of the first shaft; and a first plurality of grooves positioned in the first wall of the housing and shaped to respectively receive the first projection at respective different positions corresponding to respective different predetermined stops of the first latch member.

Example #12

The multi-latch assembly of Example #11, or any of the preceding or subsequent examples, further comprising a second detent assembly configured to provide a second plurality of predetermined stops for the second latch member, the second detent assembly comprising:

a second projection extending from an outer surface of the second shaft; and a second plurality of grooves positioned in the second wall of the housing and shaped to respectively receive the second projection at respective different positions corresponding to respective different predetermined stops of the second latch member.

Example #13

The multi-latch assembly of Example #12, or any of the preceding or subsequent examples, further comprising:

a first biasing mechanism configured to bias the first projection toward the first wall; and a second biasing mechanism configured to bias the second projection toward the second wall.

Example #14

The multi-latch assembly of Example #13, or any of the preceding or subsequent examples, wherein the first shaft further comprises an inward extension extending away from an outer periphery of the first shaft, wherein the first biasing mechanism is positioned between the second wall and the inward extension of the first shaft.

Example #15

The multi-latch assembly of Example #14, or any of the preceding or subsequent examples, wherein the second shaft further comprises an outward extension extending away from a central axis of the second shaft, wherein the second biasing mechanism is positioned between the inward extension of the first shaft and the outward extension of the second shaft.

Example #16

The multi-latch assembly of Example #5, or any of the preceding or subsequent examples, further comprising a third latch member comprising:

a third arm; and a third shaft that extends from the third arm and that is received within the second shaft so that the third arm is rotatable independently of the first arm and the second arm.

Example #17

A method of assembling a multi-latch assembly, the method (which may include features of any of the preceding or subsequent examples) comprising:

inserting a first shaft through a first passage of a first wall of a housing so that a first arm extending angled away from the first shaft remains outside the first wall;

inserting a second shaft into an axial opening of the first shaft; and moving the second shaft through the axial opening of the first shaft, beyond the first wall of the housing, and into a second passage of a second wall of the housing so that a second arm extending angled away from the second shaft remains outside the first wall.

Example #18

The method of Example #17, or any of the preceding or subsequent examples, further comprising:

moving the second shaft through the second passage of the second wall of the housing so that a distal end of the second shaft extends through the second wall; and coupling a retainer at or adjacent the distal end of the second shaft to prevent or inhibit movement of the distal end of the second shaft through the second passage toward the first wall.

Example #19

The method of Example #17, or any of the preceding or subsequent examples, further comprising:

pre-inserting a first biasing mechanism into a distal end of the first shaft to result in placement of the first biasing mechanism in between the second wall of the housing and an inward extension of the first shaft extending away from an outer periphery of the first shaft; and pre-inserting a second biasing mechanism into a proximal end of the first shaft to result in placement of the second biasing mechanism in between the inward extension of the first shaft and an outward extension of the second shaft extending away from a central axis of the second shaft.

Example #20

The method of Example #17, or any of the preceding examples, further comprising:

inserting a first pin of a first detent assembly into a first mounting hole in the first shaft at a position located between the first wall and the second wall of the housing so as to facilitate the first pin engaging respective grooves on the first wall to provide respective predetermined stops for the first arm; and inserting a second pin of a second detent assembly into a second mounting hole located in a portion of the second shaft extending away from the first wall and beyond the second wall so as to facilitate the second pin engaging respective grooves on the second wall to provide respective predetermined stops for the second arm.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
   a seat back;
   a tray table moveable between a stowed table position along the seat back and a deployed table position;
   a secondary member separate from the tray table and moveable between a stowed member position along the seat back and a deployed member position; and
   a multi-latch assembly configured to independently secure the tray table in the stowed table position and to independently secure the secondary member in the stowed member position, the multi-latch assembly comprising:
   a housing coupled with or forming a part of a portion of the seat back between the tray table and the secondary member;
   a first shaft received in the housing and defining a first opening along a central axis of the first shaft;
   a first arm extending angled away from the first shaft and pivotable in response to rotation of the first shaft;
   a second shaft received in the first opening of the first shaft; and
   a second arm extending angled away from the second shaft and pivotable in response to rotation of the second shaft.

2. The passenger seat of claim 1, wherein the second arm is pivotable independently of rotation of the first shaft such that the first arm is independently pivotable between retaining and releasing one of the tray table or the secondary member and such that the second arm is independently pivotable between retaining and releasing the other of the tray table or the secondary member.

3. The passenger seat of claim 1, wherein the housing comprises an inner surface sized and arranged as a bearing surface for an exterior of the first shaft.

4. The passenger seat of claim 1, wherein the first shaft comprises an inner surface having at least a portion sized and arranged as a bearing surface for at least a portion of an exterior of the second shaft.

5. The passenger seat of claim 1, wherein the first arm and the second arm are arranged such that the tray table of the passenger seat is releasably retained by operation of the first arm or the second arm.

6. The passenger seat of claim 1, further comprising a housing comprising:
   a first wall having a first passage sized to receive the first shaft; and
   a second wall having a second passage sized to receive a portion of the second shaft that extends beyond an end of the first shaft.

7. The passenger seat of claim 6, further comprising at least one biasing mechanism configured to bias at least one of the first arm or the second arm away from the second wall.

8. The passenger seat of claim 6, further comprising a retainer coupled with the second shaft to prevent movement of an end of the second shaft through the second passage toward the first wall.

9. The passenger seat of claim 6, further comprising a first detent assembly configured to provide a first plurality of predetermined stops for the first arm.

10. The passenger seat of claim 9, wherein the first detent assembly comprises:
    a first projection extending from an outer surface of the first shaft; and
    a first plurality of grooves positioned in the first wall of the housing and shaped to respectively receive the first projection at respective different positions corresponding to respective different predetermined stops of the first arm.

11. The passenger seat of claim 10, further comprising a second detent assembly configured to provide a second plurality of predetermined stops for the second arm, the second detent assembly comprising:
    a second projection extending from an outer surface of the second shaft; and
    a second plurality of grooves positioned in the second wall of the housing and shaped to respectively receive the second projection at respective different positions corresponding to respective different predetermined stops of the second arm.

12. The passenger seat of claim 11, further comprising:
    a first biasing mechanism configured to bias the first projection toward the first wall; and
    a second biasing mechanism configured to bias the second projection toward the second wall.

13. The passenger seat of claim 12, wherein the first shaft further comprises an inward extension extending away from an outer periphery of the first shaft, wherein the first biasing mechanism is positioned between the second wall and the inward extension of the first shaft.

14. The passenger seat of claim 13, wherein the second shaft further comprises an outward extension extending away from a central axis of the second shaft, wherein the second biasing mechanism is positioned between the inward extension of the first shaft and the outward extension of the second shaft.

15. The passenger seat of claim 1, further comprising a third latch member comprising:
    a third arm; and
    a third shaft that extends from the third arm and that is received within the second shaft so that the third arm is rotatable independently of the first arm and the second arm.

16. A passenger seat comprising:
    a seat back;
    a tray table moveable between a stowed table position along the seat back and a deployed table position;
    a secondary member separate from the tray table and moveable between a stowed member position along the seat back and a deployed member position; and
    a multi-latch assembly configured to independently secure the tray table in the stowed table position and to independently secure the secondary member in the stowed member position, the multi-latch assembly comprising:
    a housing coupled with or forming a part of a portion of the seat back between the tray table and the secondary member;
    a first shaft received in the housing and defining a first opening along a central axis of the first shaft;
    a first arm extending angled away from the first shaft and pivotable in response to rotation of the first shaft;
    a second shaft received in the first opening of the first shaft; and
    a second arm extending angled away from the second shaft and pivotable in response to rotation of the second shaft, wherein the second arm is pivotable independently of rotation of the first shaft such that the first arm is independently pivotable between retaining and releasing one of the tray table or the secondary member and such that the second arm is independently pivotable between retaining and releasing the other of the tray table or the secondary member.

17. The passenger seat of claim 16, wherein the housing comprises a housing inner surface sized and arranged as a bearing surface for an exterior of the first shaft; and wherein the first shaft comprises a first shaft inner surface having at least a portion sized and arranged as a bearing surface for at least a portion of an exterior of the second shaft.

18. A passenger seat comprising:

a seat back;

a tray table moveable between a stowed table position along the seat back and a deployed table position;

a secondary member separate from the tray table and moveable between a stowed member position along the seat back and a deployed member position; and a multi-latch assembly configured to independently secure the tray table in the stowed table position and to independently secure the secondary member in the stowed member position, the multi-latch assembly comprising:

a housing coupled with or forming a part of a portion of the seat back between the tray table and the secondary member;

a first shaft received in the housing and defining a first opening along a central axis of the first shaft;

a first arm extending angled away from the first shaft and pivotable in response to rotation of the first shaft;

a second shaft received in the first opening of the first shaft; and a second arm extending angled away from the second shaft and pivotable in response to rotation of the second shaft; and wherein:

the housing comprises a housing inner surface sized and arranged as a bearing surface for an exterior of the first shaft; or the first shaft comprises a first shaft inner surface having at least a portion sized and arranged as a bearing surface for at least a portion of an exterior of the second shaft.

19. The passenger seat of claim 18, wherein the housing comprises a housing inner surface sized and arranged as a bearing surface for an exterior of the first shaft.

20. The passenger seat of claim 18, wherein the first shaft comprises a first shaft inner surface having at least a portion sized and arranged as a bearing surface for at least a portion of an exterior of the second shaft.

21. A multi-latch assembly comprising:

a first latch member comprising:

a first arm; and a first shaft that extends from the first arm and that is at least partially hollow; and a second latch member comprising:

a second arm; and a second shaft that extends from the second arm and that is received within the first shaft of the first latch member so that the first arm and the second arm are rotatable independently of one another.

\* \* \* \* \*